V. MULHOLLAND.
CLOSURE FOR MOLTEN GLASS OUTLETS.
APPLICATION FILED JULY 26, 1921.
1,421,810. Patented July 4, 1922.
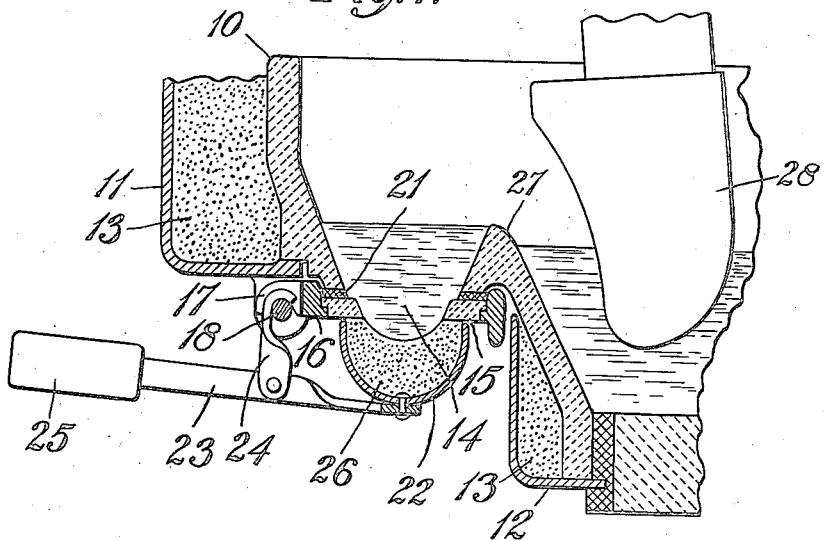
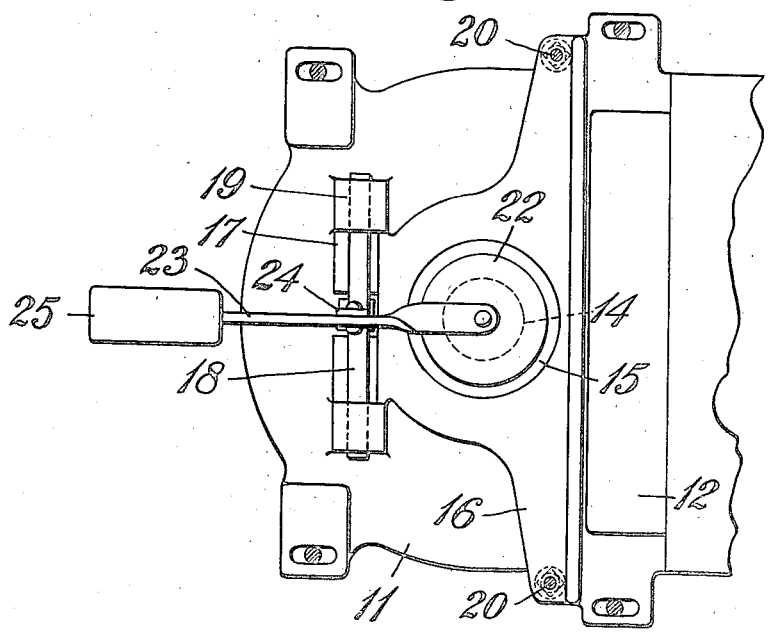
Inventor
Vergil Mulholland
By: W H Honiss, Att'y.

UNITED STATES PATENT OFFICE.

VERGIL MULHOLLAND, OF WEST HARTFORD, CONNECTICUT, ASSIGNOR TO HARTFORD-FAIRMONT COMPANY, OF CANAJOHARIE, NEW YORK, A CORPORATION OF NEW YORK.

CLOSURE FOR MOLTEN-GLASS OUTLETS.

1,421,810.      Specification of Letters Patent.      Patented July 4, 1922.

Application filed July 26, 1921. Serial No. 487,585.

*To all whom it may concern:*

Be it known that I, VERGIL MULHOLLAND, a citizen of United States, residing at West Hartford, in the county of Hartford and State of Connecticut, have invented new and useful Improvements in Closures for Molten-Glass Outlets, of which the following is a specification.

This invention relates to containers for feeding molten glass and has for its object to provide improved detachable means for closing the outlet of the container and maintaining the walls of the outlet and the molten glass within and adjacent thereto at a high temperature, or in other words, preventing the escape of heat through the outlet and its walls, so that the glass is prevented from freezing in the outlet when the feeding operation is temporarily discontinued, and both the glass and the outlet are kept in normally heated condition, whereby the glass flows normally from the container upon resumption of feeding.

Further objects will appear from the following description taken in connection with the accompanying drawings, illustrating one embodiment of the invention, in which:

Figure 1 is a sectional elevation of a portion of a container embodying the invention, and Fig. 2 is a bottom plan of the same.

The drawings show this improved device as applied to the discharge outlet of a well-known form of commercial apparatus for feeding molten glass from a melting tank or furnace to forming molds, in which the glass in the container 10 is separated from the supply of molten glass by a dam 27 over which the glass is supplied to the container by means of a moving paddle or displacer 28. This, however, is merely by way of illustration, since the device can be applied to any other container having a discharge outlet for molten glass, in some of which the glass flows to the discharge outlet by gravity, either directly or through a siphon.

In the operations of making glassware, it is frequently desirable to stop the delivery of the molten glass, either while changing the molds or otherwise readjusting the ware forming machinery to which the glass is being delivered, or while changing the temperature of the glass, if it should become too hot or too cold. The present device enables the flow of glass to be stopped for any of these purposes without chilling the discharge outlet or the glass adjacent thereto. While the present invention discloses a device adapted to serve both as a closure for the glass discharge outlet and as heat insulating means therefor, it may be employed in connection with other devices for closing the outlet, such as a plug mounted in the container to close the outlet from within, or otherwise positioned to effect the closing of the outlet when necessary. In cases of this kind, the invention will be used simply as an insulating device, but will be capable of use for both purposes if desired.

It has been found in practice that unless the discharge outlet of the container is kept hot when the flow is stopped, the walls and edges of the outlet will chill and the quiescent glass adjacent to the orifice will freeze, or at least lose a sufficient amount of heat to cause difficulty in getting the glass to resume its flow properly from the container at the desired time. The use of burners or blow torches for thus keeping the outlet and the adjacent glass heated, or to remelt the glass after it has become chilled is objectionable because of the difficulty of maintaining the desired heat, of distributing it uniformly, or where needed, and because of the disintegrating effect of the flame on the exterior of the container and its outlet parts, and on the adjacent shears or other destructible parts. Moreover, an hour or more is frequently required for thus re-melting the frozen glass and getting it into proper uniform flowing condition again, such delays being very expensive, in addition to the cost of the fuel required.

By the use of the present invention the outlet and its adjacent glass are maintained in a suitable working condition, by conserving the heat of the glass in its container, preventing the external loss of heat to the outside atmosphere and enabling the entire body of contained glass to be maintained at a proper temperature by the burners or other heating means employed within the furnace or container.

The structure shown in the accompanying drawings comprises a container 10 of refractory material heated internally by burners or other suitable means, and surrounded or partially surrounded by the upper and lower casings 11 and 12 respectively, which are spaced from the walls of the container and filled with suitable heat insulating material 13. The container as herein shown is provided with a submerged outlet 14, against which a renewable outlet ring 15 of refractory material may be clamped. This ring is carried in a metal holder 16 having spaced open-sided hinge lugs 17 extending over a pivot pin 18 supported by lugs 19 on the casing 11. By this construction the holder is hinged upon the container and may be clamped in position thereon by the bolts 20 which are suitably connected with the container. Between the outlet ring 15 and the container is a packing 21 of refractory material. The outlet ring and the parts for holding the same in position may be omitted as they are not essential to the present invention.

The closure for insulating the outlet comprises a holder preferably in the form of a bowl or cup 22, loosely connected with one end of a lever 23, so that it will rock freely thereon. The lever is pivoted intermediate its ends on a hook 24, which is detachably hooked over the pivot pin 18 between the lugs 17 of the container casing or over any suitable support. At the outer end of the lever is a weight 25 which holds the closure in engagement with the bottom of the outlet ring 15, or directly in engagement with the container if the ring is omitted. The cup is substantially filled with a suitable heat insulating material 26, preferably in loose form, such as powdered kieselguhr, or any other suitable heat insulating material may be used.

The insulation 26 is free to conform to the shape of the lower surface of the glass within or beneath the outlet, thereby permitting the insulation to be squeezed into contact with the lower surface of the outlet ring, thus providing substantially an air tight closure for the outlet. The closure may be quickly connected with and detached from the container, and when in position thereon, the outlet will be completely insulated and kept from chilling. This prevents the glass within the outlet from freezing when the flow is stopped, whereby it will be kept in condition to resume its flow more readily and in proper working condition from the container at the desired time.

In the use of the apparatus illustrated in Fig. 1, the paddle is sometimes continued in operation during the stoppage and while heating the glass, so as to bring forward the hotter glass from the supply into the container 10, and allowing it to flow back again, thus keeping up a circulation of the glass and serving to keep the container hot, especially in the vicinity of the discharge opening, the loss of heat being minimized by the insulated walls of the container and by the insulated closure of the present invention.

The various features of the invention may be modified both in construction and arrangement to adapt it to different uses or to different conditions of service.

I claim:—

1. A holder provided with heat insulating material arranged to be connected with the discharge outlet of a container for molten glass to prevent the escape of heat therefrom.

2. A closure for the discharge outlet of a container for molten glass, comprising a detachable holder carrying heat insulating material adapted to close the outlet and to insulate the same.

3. A closure for the discharge outlet of a container for molten glass, comprising a holder carrying heat insulating material adapted to close the outlet and means for detachably positioning the closure relative to the outlet.

4. An insulating closure for the discharge outlet of a container for molten glass, comprising a holder provided with heat insulating material adapted to close the outlet, means for positioning the closure relative to the outlet, and means for yieldingly holding the closure against the outlet.

5. The combination with a container for molten glass having a discharge outlet, of a holder, and heat insulating material carried by the holder to insulate the outlet when not in use.

6. The combination with a container for molten glass having a discharge outlet, of a quick detachable heat insulating device adapted to cover the outlet from the outside.

7. The combination with a container for molten glass having a discharge outlet, of a removable holder carrying loose insulation for covering the outlet to insulate the same when not in use.

8. The combination with a container for molten glass having a discharge outlet, of a holder carrying heat insulating material of a nature permitting it to conform to the shape of the lower surface of the glass at the outlet.

9. The combination with a container for molten glass having a discharge outlet, of heat insulating material forming a closure for the outlet adapted to seal the latter, and a detachable weighted member adapted to hold the closure in position.

10. The combination with a container for molten glass having a discharge outlet, of a closure comprising a quick detachable cup containing heat insulating material for closing the outlet.

11. The combination with a container for molten glass having a discharge outlet, of a closure therefor having a holder for heat insulating material, and a lever connected with the holder and pivotally supported adjacent the outlet.

12. The combination with a container for molten glass having a discharge outlet, of a closure therefor having a holder for heat insulating material, provided with a lever pivotally supported adjacent the outlet, and weighted to hold the closure against the outlet.

13. The combination with a container for molten glass having a discharge outlet, of a closure adapted to close the discharging end of the outlet, and a weighted member adapted to hold the closure in position.

14. The combination with a container for molten glass having a discharge outlet, of a closure adapted to close the discharging end of the outlet, and a lever arranged to hold the closure in closing position, the lever having a detachable pivotal connection for supporting it adjacent the outlet.

Signed at Hartford, Conn., this 21st day of July, 1921.

VERGIL MULHOLLAND.